United States Patent [19]

Bristow et al.

[11] Patent Number: 4,789,212
[45] Date of Patent: Dec. 6, 1988

[54] INTEGRATED OPTICAL POLARIZER WITH HIGH EXTINSTION RATIO AND LOW INSERTION LOSS, AND IMPROVED METHOD OF FABRICATION THEREOF

[75] Inventors: Julian P. G. Bristow, Naperville; Michael Keur, Niles; Gregory J. Lukas, Wheaton; Sriram Sriram; Albert C. Wey, both of Naperville, all of Ill.

[73] Assignee: Amphenol Corporation, Wallingford, Conn.

[21] Appl. No.: 945,736

[22] Filed: Dec. 22, 1986

[51] Int. Cl.[4] ................................................. G02B 6/12
[52] U.S. Cl. ............................... 350/96.12; 350/96.11
[58] Field of Search ................ 350/96.11, 96.12, 96.13, 350/96.14

[56] References Cited

PUBLICATIONS

Hickernell, "Low Loss Zinc Oxide Optical Waveguides on Amorphous Substrates", Conference: Integrated and Guided-Wave Optics Technical Digest; Incline Village, N.Y., U.S.A., 128-30, Jan. 1980); pp. WB6-1-WB-6-4.

Masuda et al.; "An Optical Waveguide Mode Spliter In-Ti-Diffused LiNbO$_3$"; Sixth European Conference on Optical Communication, York, England; (16-19 Sep. 1980), pp. 264-268.

Bristow et al.; "Novel Integrated Optical Polarisers Using Surface Plasma Waves and Ion Milled Grooves in Lithium Niobate"; Electronics Letters 6th Dec. 1984, vol. 20, No. 25/26; pp. 1047-1048.

Primary Examiner—John D. Lee
Assistant Examiner—John Ngo
Attorney, Agent, or Firm—Bacon & Thomas

[57] ABSTRACT

An optical polarizer is described in which a propagation layer, i.e., a titanium diffused light guiding region in a lithium niobate Z-cut crystal, is covered with a dielectric buffer layer of ZnO. The dielectric buffer layer is covered by a meal layer, typically aluminum, although gold or silver can be used. The thickness of the buffer is chosen so as to increase the attenuation of TM modes of radiation in the waveguide relative to TE modes. The buffer layer thickness can fall within a broad range and is not required to fall within a very precise range to achieve a peak level of attenuation.

14 Claims, 2 Drawing Sheets

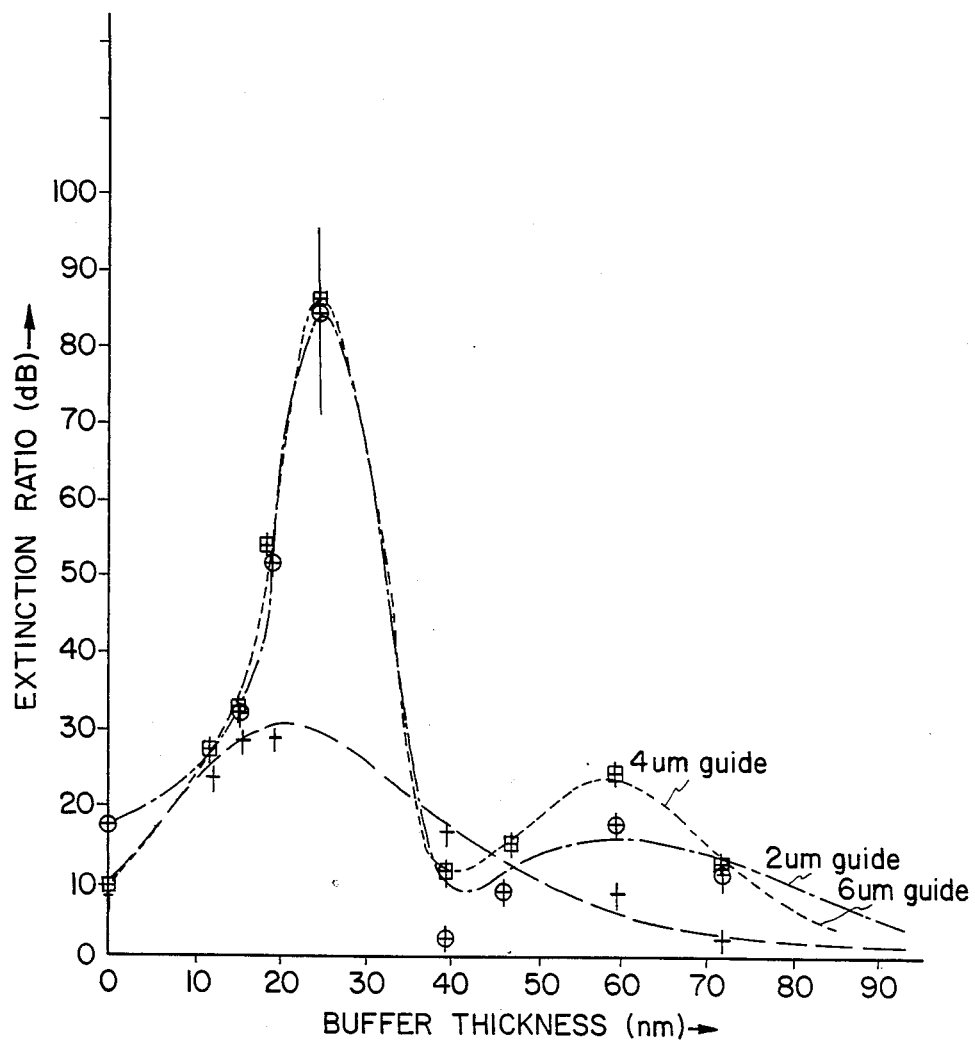

INTEGRATED OPTICAL POLARIZER WITH HIGH EXTINSTION RATIO AND LOW INSERTION LOSS, AND IMPROVED METHOD OF FABRICATION THEREOF

BACKGROUND OF THE INVENTION

This invention relates to a guided wave optical polarizer of the type for use in a large number of optical fiber sensors and transmission systems, for example, fiber optic gyroscopes.

As is well known to those of ordinary skill in the art, at short wave-lengths, such as will be used in many sensor systems, integrated optical waveguides often suffer from optical damage. More specifically, it is generally known that propagation along the Z-axis eliminates this problem. On the other hand, undesired modal conversion properties restrict the application of such guides to those not involving electrical fields. The modal conversion properties are, as is well known, a result of the approximate degeneracy of the quasi TE and TM modes.

Thus, it is also known from the prior art that a discrete optical polarizer may be fabricated by a series of dielectric and metal overlays on an existing waveguide, for example, a lithium niobate or a lithium tantalate crystal having a light guiding region defined thereon by means of, for example, titanium diffusion. By using the Z-propagation direction certain important advantages are obtained.

Included among these advantages is the fact that the polarizer will have high resistance to optical damage, and the extinction ratio will therefore be independent of both input power and time. In addition, the mode profile will be reasonably symmetric due to equal diffusion constants for titanium and the two directions orthogonal to the propagation direction and thus, efficient coupling to optical fibers may be realized. And finally, modal conversion is eliminated due to the lifting of the degeneracy of the two orthogonal modes. This is due to a coupling of the TM-like modes to the surface plasma wave supported by the dielectric metal interface.

Several prior art approaches have involved the use of different materials. More specifically, the most common approach is to sputter or evaporate an SiO overlay onto the light guiding region and thereafter, depositing, by either sputtering or evaporation, a layer of aluminum over the dielectric SiO. While generally giving high extinction ratios, for example, as shown in FIG. 3 which is representative of a lithium niobate, titanium diffused guide, with a dielectric layer of SiO overlayed by aluminum, the use of the prior art known dielectrics has been highly thickness dependent with any variation in any direction, i.e. towards the thinner or thicker side, resulting in less than good results. More specifically, the peak for extinction ratios as shown for a waveguide polarizer with three nominal guide widths, shown for clarity in FIG. 3 occurs within a very narrow range, for example, within a buffer thickness of 20 to 30 nm. It will be appreciated from the following detailed discussion that the terms dielectric and buffer will be used interchangeably and are used to mean the same thing.

Other known prior art polarizing layers involve the use of $Si_3N_4$ with a silver or gold overlay. Again, as in the case with SiO, the maximum polarization effectiveness will peak at precise values, thus making the manufacture of these devices very tedious, difficult and expensive because of the unusual control of the sputtering or deposition process required.

Other methods of inducing mode selective properties in an integrated optical strip waveguide include the use of biferingent crystal or liquid crystal overlays, proton exchange techniques either within or outside the waveguide, specific waveguide directions with respect to the crystal surface or anisotropic fabrication.

Each of these techniques include complications which are undesirable in the manufacture thereof. For instance, overlaying crystals requires the maintenance of pressure on the crystal, is expensive, bulky and requires accurately polished crystal surfaces. In addition, the unwanted mode is diverted from the waveguide, not attenuated, and may therefore be scattered back into the waveguide. The best reported extinction ratios has been 30 dB for these devices and the mechanical stability is also questionable.

Proton exchange is a relatively new technique for fabricating integrated optical devices. Unfortunately, there exists problems associated with both short and long-term drift with time, temperature, and applied electric field. Moreover, the waveguide dimensions required to achieve single mode strip waveguides are smaller than for titanium in-diffused guides and thus, hybrid systems incorporating both proton exchange and titanium in-diffused guides suffer problems of alignment and modal conversion at the boundary of the two guides.

Thus, in accordance with the present invention, the above-discussed problems are avoided and an effective method and device are provided which is easy to manufacture and which does not require the precise tolerance controls in the manufacture thereof, while still achieving high attenuation ratios along one mode with little or no attenuation along the other mode.

SUMMARY OF THE INVENTION

In accordance with the invention, an integrated optical circuit device for polarizing light comprises an in-diffused channel light guiding region in a substrate comprising lithium niobate or lithium tantalate. The substrate is a Y-cut or Z-cut lithium niobate or lithium tantalate crystal, preferably Z-cut, with the light guiding region having been defined by diffusing titanium into the crystal. A dielectric layer of ZnO overlies the light guiding region and is adhered to the substrate. In addition, an aluminum or other like metal layer such as Gold or Silver, overlies the ZnO layer and is adhered thereto. The ZnO and aluminum layers are of a thickness effective to cause substantial attenuation of TM-like modes of light being transmitted through the light guiding region while minimizing attenuation for TE like modes, i.e., low insertion loss.

As noted previously, in a still more specific aspect, the crystal is Z-cut lithium niobate. The thickness of the crystal is about 20 to 40 mils. Further, the ZnO and aluminum layers cover a length of light guiding region of at least about 2 mm, typically 6–10 mm and up to about 20 mm. In yet still more specific aspects, the thickness of the ZnO layer is about 200–2,000 Angstroms, preferably 200–700 Angstroms, and most preferably about 700 Angstroms. With respect to the aluminum, it is preferably a thickness of greater than about 1,000 Angstroms and most preferably, about 3,000 Angstroms. The ZnO and aluminum layers are adhered to the crystal by RF-sputtering. Where a Z-cut lithium niobate crystal is employed, symmetric mode profile can be achieved.

In yet another aspect of the invention, it is directed to a method of manufacturing an optical polarizer comprising the steps of in-diffusing titanium into a Z-cut lithium niobate crystal in a manner such as to define a light guiding region extending the length thereof from end to end. A layer of ZnO is deposited over a substantial portion of the light guiding region, and thereafter, a layer of aluminum is deposited over the deposited ZnO layer.

As noted previously, the method comprises depositing the ZnO and aluminum by RF sputtering, or preferably, over a length of the light guiding region of at least about 2 mm, typically 6–10 mm and up to about 20 mm, with a thickness of ZnO of about 200–2,000 Angstroms, and the aluminum at a thickness of greater than about 1,000 Angstroms.

In a yet still more preferable aspect of the method, the thickness of the ZnO is deposited in a thickness of about 200–700 Angstroms, most preferably 700 Angstroms, with the aluminum being deposited in a thickness of about 3,000 Angstroms. With respect to the crystal itself, the method is conducted on a crystal of about 20–40 mils thickness and of a length of at least 2 mm, preferably greater than about 6 mm to about 10 mm, and up to about 20 mm with the overlay covering the length of light guiding region of at least 6 mm to about 10 mm.

With respect to the light guiding region itself, this is achieved by in-diffusing a layer of titanium along the length thereof a thickness typically of about 600–750 Angstroms.

BRIEF DESCRIPTION OF THE DRAWINGS

Having briefly described the invention, the same will become better understood from the following detailed discussion taken in conjunction with the attached drawings wherein:

FIG. 3 is a graph showing prior art test results with the use of silicon monoxide as a dielectric layer.

DETAILED DISCUSSION OF THE INVENTION

The invention relates to an optical polarizer manufactured from an integrated optical light guide device comprising an in-diffused channel light guiding region and a substrate comprising lithium niobate or lithium tantalate, preferably lithium niobate which is Z-cut. The device is typically manufactured by difining a to be fabricated light guiding region in the Z-cut lithium niobate substrate by photolithographically contact printing with a mask onto a substrate which has been coated with photoresist. Thereafter titanium is deposited onto the crystal and is diffused into the substrate to result in a light guiding region or channel in the substrate. The details of the actual manufacture of the light guide device is generally discussed in copending U.S. application Ser. No. 908,066 which was filed Sept. 16, 1986, which is commonly assigned and which disclosure is specifically incorporated by reference herein. Thus, for the sake of brevity, the details of the actual fabrication of the light guiding region on a lithium niobate Z-cut crystal will be omitted since it is already discussed in the copending application and known from other prior art documents.

On the other hand, since the polarizer in accordance with the invention is to be used in sensor applications, it is noted that it is desirable to manufacture the guide for use in waveguiding light of 1.3 micron wavelength. The titanium diffusion is such as to generate a strip waveguide with a width of about 4–8 micron and this is achieved by in-diffusing a vertical thickness of titanium of about 650–750 Angstroms.

In accordance with the more preferred aspects of the invention, a crystal of about 15 millimeters in length is employed, and is used as either an optical polarizer or as a discrete polarizing component within a sensor system environment. Polarization maintaining fibers are pigtailed to the ends of the light guiding region at either end of the crystal as generally shown in FIG. 1.

Figure 1:
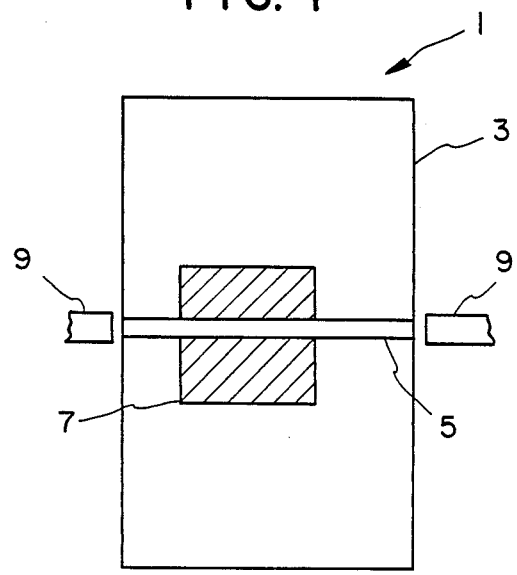
FIG. 1 is a schematic top plan view of an optical polarizer in accordance with the invention.

More specifically, the polarizer 1 as shown in FIG. 1 includes a lithium niobate Z-cut crystal substrate 3 of at least 2 mm to about 20 mm in length along the light guiding region, typically at least 6–10 mm and preferably about 15 mm. A light guiding region 5 is defined by in-diffusing titanium, as previously discussed. Polarization maintaining fibers 9 are then pigtailed to the ends of the light guiding regions 5 by conventional epoxy adhering or laser slotting near the ends of the crystal 3. A polarizing overlay 7 is then deposited, typically by RF-sputtering onto the light guiding region to cover the light guiding region over a length of at least about 6 mm, typically 6–10 mm. With respect to the crystal itself, it is of a thickness top to bottom, (not shown), of about 20 nm, and the width of the dielectric overlay 7 is, as desired by those practicing the invention, with the only requirement being that it cover the width of the light guiding region 5.

Turning now to the details of the manufacture of the overlay, it is done by conventional RF-sputtering. Initially, a layer of ZnO is deposited, with the layer being such that it is of a thickness of anywhere between 200–2,000 Angstroms, typically 200–700 Angstroms and most preferably about 700 Angstroms. Thereafter, aluminum is RF-sputtered onto the ZnO overlay with the sputtering being done such that the aluminum is deposited in a thickness of greater than about 1,000 Angstroms, most preferably about 3,000 Angstroms. As will be appreciated from the test results set forth hereinafter, the deposition thickness is not critical and can fall within a very broad range as contrasted to the prior art, and thus, precise tolerances to achieve high extinction ratios and low insertion loss are not required. This will be discussed in greater detail hereinafter.

Figure 2:
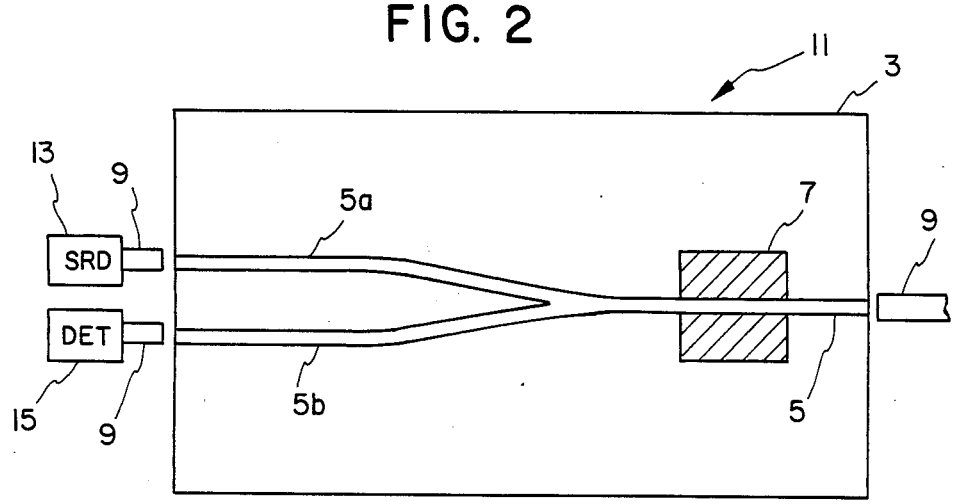
FIG. 2 is an alternative view of a modified version of the optical polarizer of the invention, shown modified for use in a specific sensor environment with other integrated optics components.

The device shown in FIG. 2 is a specifically configured Y branch light polarizer 11 having components already connected thereto for use in a sensor environment, for example, and a fiber optic gyroscope environment. More specifically, the Y branch polarizer 11, as in the case with FIG. 1, includes a lithium niobate Z-cut crystal 3 having a light guiding region 5 thereon which branches into two branches 5a and 5b. Each of the branches 5a and 5b are pigtailed to polarization maintaining fibers 9 which are respectively connected to a super radiant diode and to a detector such that light can be transmitted through branch 5a to a sensor, after being polarized by the polarizing overlay 7, and the feedback detected by transmission through branch 5b to the detector 15.

Having briefly discussed the invention in detail, the same will become better understood from the following examples.

EXAMPLE 1

Devices in accordance with FIG. 1 were manufactured having a buffer layer of refractive index of approximately 2.0 with aluminum used for the cover metal over the dielectric. The device was manufactured from a Z-cut lithium niobate waveguide of thickness of about 20–40 mils. The Z-cut waveguides were prepared by in-diffusion of 650 Angstroms of titanium for eight hours. Ten waveguides were fabricated on the crystals. Half of the waveguides were covered with photoresist, and one sample was coated with 10 nm of ZnO dielectric. The second half of the samples were coated with 20 nm of ZnO dielectric. RF-sputtering was used to deposit the buffer layer. The photoresist was then removed and the same thickness was added to each crystal.

This resulted in crystals with the range of buffer thicknesses from 10 nm through 20 nm to 40 nm.

The samples were then e-beam coated with aluminum to a depth of greater than about 200 nm. The completed samples were then polished for end-fire excitation and during this process, some aluminum was seen to be removed from the crystals, indicating poor adhesion of the metal. The adhesion of the ZnO dielectric was excellent.

Testing of the devices, which had a total length of aluminum of approximately 6 mm, proceeded as follows. A semi-conductor laser was aligned such that the polarization axis at the output of the fiber was parallel to the optical bench. A Glan Thomson polarizer then followed, to yield an initial polarization extinction ratio substantially in excess of 50 dB. A Soleil Babinet compensator was then set up as a halfway plate. Rotation of this to the appropriate angle enabled either TE or TM like modes to be excited within the waveguide. A conventional input/output system using microscope objectives was used. The near-field profile was imaged onto an infrared sensitive camera. The Soleil Babinet compensator was then rotated and adjusted to give minimum transmission. The intensity of the signal received on the camera was recorded. The compensator was then rotated to give maximum transmission. ND filters, calibrated with the laser source used, were then inserted between the output objective and the camera until the TM intensity was matched. The ND value required was also recorded.

Of the four devices tested, the best extinction ratio, averaged over four guides, was found to be 39 plus/minus 3 dB, i.e., accordingly, high losses or high attenuation was achieved in one mode with little or no losses or attenuation, i.e., low insertion loss, in the other mode. It is emphasized that the measurement technique is not precise and the area of contact between the buffer layer and the aluminum is small.

It is noted that the extinction ratio of 39±3 dB was measured in a manner limited by the equipment employed. It is expected that the ratios were even higher and these ratios were achieved over a wide range of buffer thicknesses.

EXAMPLE 2

Additional devices were manufactured having different thickness ZnO with aluminum thickness set constant at approximately 0.3 microns with a Z-cut polarizer of lithium niobate manufactured for 1.3 micron wavelength light as discussed previously. The results for maximum attenuation are set forth as follows in the table below, it being noted that in the mode which was not desired to be attenuated, i.e., low insertion loss, maximum attenuation was a value of minus 3 dB.

| ZnO thickness (Angstroms) | Extinction ratio (+/− 3 dB approx) |
| --- | --- |
| 100 | 38 dB |
| 200 | 29 dB |
| 300 | 40 dB |
| 400 | 44 dB |
| 500 | 40 dB |
| 700 | 48 dB |

As is noted from the above table with respect to the broad range of ZnO thickness, the range of ZnO thickness to achieve high extinction ratios can vary over a broad range as contrasted to the use of SiO which yields results as in FIG. 3. Thus, the device in accordance with the invention can be manufactured with less tolerance control and thus, the manufacturing process can be cheaper.

It is noted from the above examples, that devices have not yet been fabricated at thicker values of ZnO, but based on the test results, at some stage the extinction ratio is predicted by theory to reduce to negligible values. This can be extracted from the graph set forth in FIG. 3. It is also noted that the experimental arrangement did not allow measurement of values higher than 45–50 dB, and even higher extinction ratios can be expected by using the device and method in accordance with the invention, the only limitation at this time being with respect to the actual measurement equipment employed.

Although aluminum has been described as the preferred material because of reduced cost and its adherence to ZnO, it is also noted that aluminum can be substituted for by other equivalent metals without substantially detrimentally affecting operating results of the device. The only essential requirement in accordance with the invention is that the dielectric buffer layer be ZnO which yields much improved results over the prior art.

What is claimed is:

1. An integrated optical circuit device for polarizing light comprising: an in-diffused channel light guiding region in a substrate comprising LiNbO3 or LiTaO3, said substrate being a Y-cut or Z-cut LiNbO3 or LiTaO3 crystal with said light guiding region having been defined by diffusing titanium into the crystal; a dielectric layer of ZnO overlying the light guiding region and adhered to the substrate; an aluminum layer overlying the ZnO layer and adhered thereto; and said ZnO and aluminum layers being of a thickness effective to cause substantial attenuation of TM like modes of light being transmitted through the light guiding region while minimizing attenuation for TE like modes.

2. A device as in claim 1 wherein said crystal is Z-cut LiNbO3 crystal.

3. A device as in claim 2 wherein the thickness of said crystal is about 20–40 mils.

4. A device as in claim 2 wherein said ZnO and aluminum layers cover a length of the light guiding region of about 6–10 mm.

5. A device as in claim 4 wherein the thickness of the ZnO layer is about 200–2,000 Angstroms.

6. A device as in claim 5 wherein the thickness of the aluminum layer is greater than about 1,000 Angstroms.

7. A device as in claim 5 wherein the thickness of the ZnO is about 200–700 Angstroms.

8. A device as in claim 4 wherein the thickness of the ZnO layer is about 700 Angstroms and the thickness of the aluminum layer is about 3,000 Angstroms.

9. A device as in claim 1 wherein said ZnO aluminum layers were adhered to the crystal by RF-sputtering.

10. A method of manufacturing an optical polarizer comprising the steps of:
 in-diffusing titanium into a Z-cut LiNbO$_3$ crystal in a manner such as to define a light guiding region extending the length thereof from end to end;
 depositing a layer of ZnO over a substantial portion of said light guiding region; and
 depositing a layer of aluminum over said deposited ZnO layer.

11. A method as in claim 10 wherein said ZnO and aluminum are deposited by RF sputtering.

12. A method as in claim 11 wherein said ZnO and aluminum are deposited over a length of the light guiding region of about 6–10 mm, the ZnO is deposited at a thickness of about 200–2,000 Angstroms and the aliminum is deposited at a thickness of greater than about 1,000 Angstroms.

13. A method as in claim 12 wherein said thickness of the ZnO is about 200–700 Angstroms.

14. A method as in claim 12 wherein the thickness of the ZnO is about 700 Angstroms, the thickness of the aluminum is about 3,000 Angstroms and the crystal has a thickness of about 20–40 mils with the light guiding region having been defined by in-diffusing a layer of titanium along the length thereof of a thickness of about 650 Angstroms.

* * * * *